United States Patent [19]

Wall et al.

[11] Patent Number: 5,443,123
[45] Date of Patent: Aug. 22, 1995

[54] METHOD OF PARTICULATE CONSOLIDATION

[75] Inventors: Stanley J. Wall, Lafayette; David B. Allison, Carencro; Michael W. Henry, Lafayette, all of La.

[73] Assignee: Halliburton Company, Duncan, Okla.

[21] Appl. No.: 213,131

[22] Filed: Mar. 14, 1994

[51] Int. Cl.⁶ .................................... E21B 33/138
[52] U.S. Cl. ........................... 166/288; 166/295; 166/297; 166/299
[58] Field of Search .............. 166/288, 295, 297, 298, 166/299, 300, 384, 63, 77

[56] References Cited

U.S. PATENT DOCUMENTS

| | | | |
|---|---|---|---|
| 3,346,049 | 10/1967 | Brown | 166/295 X |
| 3,362,477 | 1/1968 | Brandt | 166/295 X |
| 3,536,137 | 10/1970 | Walther | 166/295 |
| 3,759,327 | 9/1973 | Carnes | 166/295 |
| 3,791,447 | 2/1974 | Smith et al. | 166/384 X |
| 4,042,032 | 8/1977 | Anderson et al. | 166/276 |
| 4,105,073 | 8/1978 | Brieger | 166/295 X |
| 4,427,069 | 1/1984 | Friedman | 166/295 |
| 4,469,543 | 9/1984 | Young | 166/276 |
| 4,614,156 | 9/1986 | Colle, Jr. et al. | 166/63 X |
| 4,936,385 | 6/1990 | Weaver et al. | 166/288 |
| 5,062,485 | 11/1991 | Wesson et al. | 166/297 |
| 5,101,900 | 4/1992 | Dees | 166/250 |
| 5,145,013 | 9/1992 | Dees et al. | 166/295 |
| 5,154,230 | 10/1992 | Dees | 166/277 |
| 5,178,218 | 1/1993 | Dees | 166/281 |
| 5,335,725 | 8/1994 | Wyant | 166/384 X |

Primary Examiner—George A. Suchfield
Attorney, Agent, or Firm—Robert A. Kent

[57] ABSTRACT

A method of consolidating an incompetent particulate in a subterranean formation penetrated by a wellbore accomplished by introducing fluids to be injected into a wellbore into coiled tubing while the tubing is outside the wellbore and thereafter pumping the fluids from the coiled tubing into the wellbore after circulating ports open in a firing head in response to initiation of the variable delay firing head for ignition of a gas generator.

14 Claims, 1 Drawing Sheet

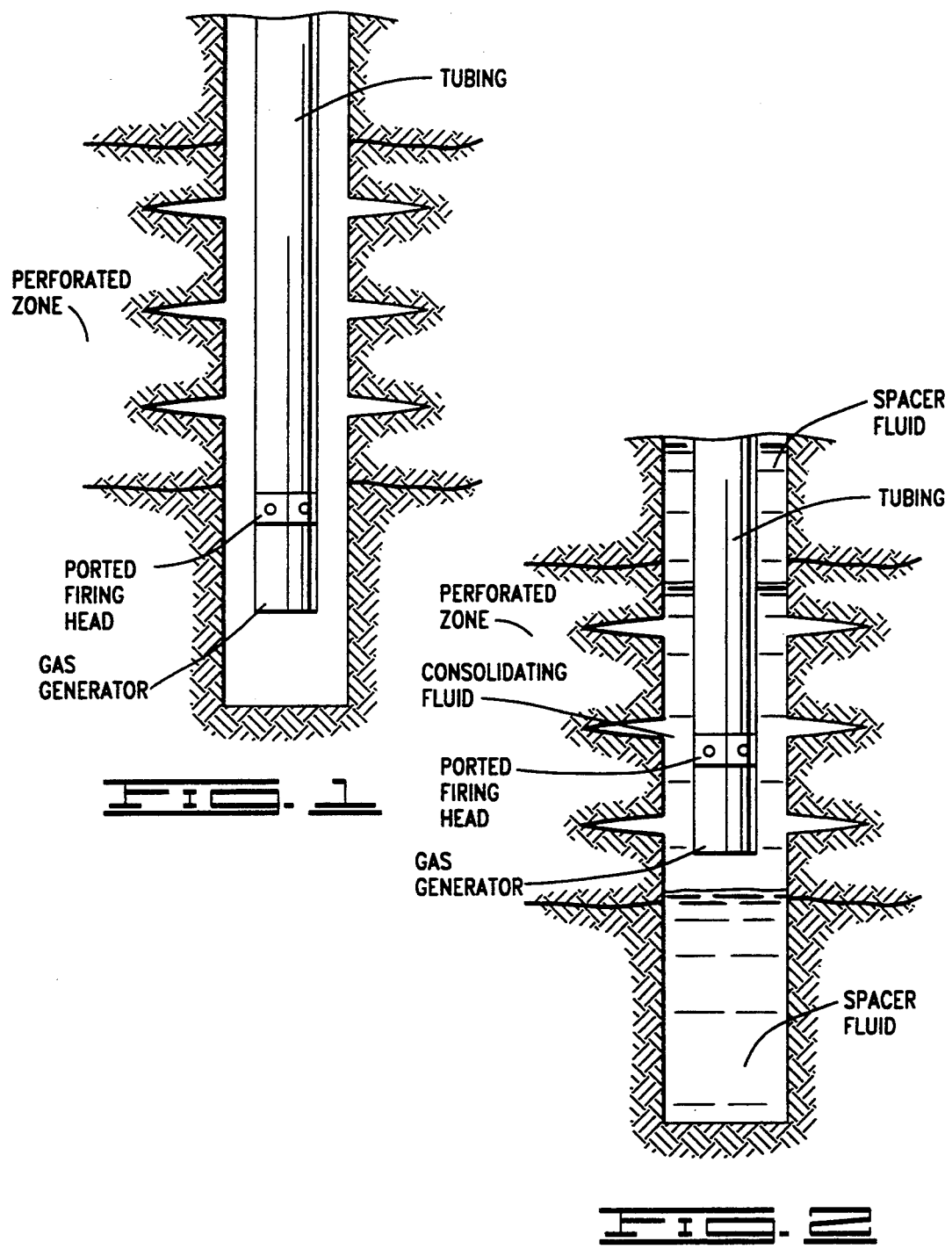

METHOD OF PARTICULATE CONSOLIDATION

BACKGROUND OF THE INVENTION

1. Field of the Invention

This Invention relates to methods of consolidating solids in the vicinity of a wellbore and more particularly relates to the consolidation of incompetent formations utilizing resinous compositions and a resin hardening catalyst including rapid acting catalysts.

2. Description of the Prior Art

Sand consolidation is a near wellbore treatment of a well to be tested or placed in production. Surrounding a wellbore in many instances are incompetent highly porous and fragmentable sand or particulate formations. Under production conditions, the particulate is often displaced from its aggregated structure and carried along by a fluid flowing to a producing well. If the particulate flow is allowed to proceed unchecked the producing wellbore soon becomes full of sand, thereby clogging oil production. Furthermore, particulate arriving at the surface of the well wears out the production hardware.

It has therefore been the subject of extensive research by the petroleum industry to develop techniques to minimize or obviate displacement of sand particles into producing well areas. One such general approach suggested in the art is to consolidate the porous particulate structures. Sand consolidation techniques are aimed at cementing loose sand structure adjacent a wellbore. Such consolidation is necessary to prevent breakdown of sand formations and subsequent clogging of producing wells.

A major feature of sand consolidation is to make a sieve next to the producing wellbore such that hydrocarbons can reach the wellbore while sand flow is retarded. The sieve is composed of formation particulate already present surrounding the wellbore area which is cemented together by consolidating material added to the formation. The consolidation need only be thick enough to prevent particulate breakdown adjacent to the wellbore. Ordinarily consolidation is effected for only a few inches around the periphery of the wellbore.

Accordingly, criteria for good consolidation are considered to be as follows. First, the consolidation structure should hold back formation particles while preserving high permeability. As consolidating material is added to the formation, this material will necessarily occupy part of the pore space causing permeability reduction. Therefore, an object of practical formation consolidation is to minimize occlusion of pore spaces so that hydrocarbons can flow to the producing wellbore.

Second, durability is a desired feature of a consolidation. The thin film of consolidating material holding the particulate should be physically durable in resisting deterioration by oil, water and other fluids in the formation.

Third, the consolidation action should not set up in the wellbore prematurely thereby occluding the wellbore path for hydrocarbon production.

Further, the consolidation operation should be simple, efficient and inexpensive. The economic significance of such an operation is great and the problems described above have been well recognized by the petroleum industry for many years. Many efforts have been made to satisfy these problems in whole or in part.

One particular approach to formation consolidation has been to inject into a well a polymerizable resin which polymerizes within the well formation. The polymer material forms a viscous mass which readily adheres to the porous particulate structures. As the particulate surfaces become coated, they no longer are subject to displacement when exposed to fluid flow. Unfortunately, the polymerization reaction is difficult to control so as to only consolidate the particulate without plugging the pore spaces and ultimately blocking permeability through the porous strata.

One of the better consolidating agents for high temperature wells is a polymerized furfuryl alcohol resin. The material resists heat as well as oil and water. The problem in using this material is in catalyzing the polymerization. If a delayed action catalyst is carried in a mixture containing the furfuryl alcohol oligomer, polymerization may occur too early causing wellbore blockage or too extensively so that permeability is lost; or alternatively, polymerization may not occur at all or be inadequate to effect consolidation.

Various processes for formation consolidation are disclosed in U.S. Pat. Nos. 3,536,137; 3,759,327; 4,042,032; 4,427,069; 4,669,543; 5,101,900; 5,145,013; 5,154,230; 5,178,218 and 4,936,385 the entire disclosures of which are incorporated herein by reference.

The technique described by the present invention represents an improvement over the methods used previously in that placement and polymerization of the resin is positively controlled and consequently the subsequent consolidation of the particulate in the formation is positively controlled in a manner whereby permeability is presevered.

SUMMARY OF THE INVENTION

The present invention provides a technique whereby an incompetent subterranean formation penetrated by a wellbore may be completed for testing or production without the undesirable production of formation solids with hydrocarbons that flow into the wellbore. The technique is accomplished in part by introducing the fluids to be injected into the wellbore into coiled tubing while the tubing is still on the surface on the reel. The fluid is introduced into the tubing in the sequence it is desired to contact the formation. A pressure activated variable time delay firing head then is attached to the end of the tubing along with a gas generator. The assembly is lowered into the wellbore until the firing head is below the depth of the perforated interval. The firing head is activated by application of pump pressure from the surface. When the time delay firing head activates, circulating ports on the firing head open. The fluids within the coiled tubing string then are pumped slowly out into the wellbore while the tubing is raised to effect substantially complete coverage of the desired interval with the resin and raise the gas generator into position immediately adjacent to the perforated interval. The gas generator then is activated by the firing head such that high pressure gases are produced which rapidly drive the consolidating fluid resin from the wellbore through the perforations and into the formation. The generated gases simultaneously acid catalyze at least a portion of the resin thereby consolidating the surrounding formation. Additional displacement fluid or catalyst contained in the coiled tubing string then may be displaced into the wellbore and into the formation to further the consolidation of the surrounding formation.

BRIEF DESCRIPTION OF THE DRAWINGS

FIG. 1 is a schematic illustration of the initial positioning of the firing head and gas generator at which point the firing head is activated and the ports opened to displace resin from the tubing string into the wellbore as the tubing is raised to position the gas generator adjacent the perforations.

FIG. 2 is a schematic illustration of the gas generator positioned in the wellbore after displacement of the consolidating resin from the tubing in preparation for introduction of the consolidating resin into the formation.

DESCRIPTION OF THE PREFERRED EMBODIMENT

In accordance With the present invention, methods of consolidating incompetent solids in a subterranean formation penetrated by a wellbore are provided. The consolidation may be effected contemporaneously with perforation of the wellbore or subsequently. The consolidation method may effect "breakdown" of the perforation to ensure communication through the perforation into the subterranean formation. The term "breakdown" as used herein is intended to mean the application of a fluid under pressure to a perforation to clean the perforation of a portion of any debris that may be present and provide effective communication to the subterranean formation for the flow of fluids into the wellbore from the formation.

In one embodiment of the present invention a series of fluids are introduced into a coiled tubing string while on the reel at the surface. The fluids are introduced in the sequence of flush or displacement fluid, catalyst, spacer fluid, consolidating fluid and spacer fluid or completion fluid, when introduced from one end of the coiled tubing. The fluids may be pumped through the tubing in a reversed order until the completion fluid reaches the end of the tubing. A pressure actuated variable time delay firing head then is attached to the end of the coiled tubing along with a gas generator. The assembly is lowered into the wellbore until the firing head is below the depth of the perforated interval (as illustrated in FIG. 1). The firing head is actuated by the application of pressure through the coiled tubing from the surface. The pressure actuated firing head may be of the type described in U.S. Pat. Nos. 5,062,485 or 4,614,156 the entire disclosures of which are incorporated herein by reference. Basically, the device comprises first means for initiating a first combustive reaction which is actuated in response to a predetermined pressure condition in at least a portion of the wellbore, means to initiate any desired number of additional combustive reactions to effect the desired delay and means for actuation of an explosive charge to activate the gas generator. One such device is available from Halliburton Energy Services, a division of Halliburton Company and is identified as Part No. 993.1036 "Pressure Activated Firing Head With Extended Delay." It should be understood that substantially any device capable of providing a delayed activation of the gas generator in response to a predetermined pressure condition would be suitable for use in the method of the present invention. The foregoing described device can provide a delay of from several minutes to in excess of 30 minutes as desired by the individual practicing the method of the present invention. Upon activation of the pressure actuated variable time delay firing head, ports open on the firing head through which the fluids contained in the coiled tubing may be pumped out and into the wellbore. The fluids contained in the coiled tubing are pumped from the tubing while the tubing is slowly raised in the wellbore to effect substantially complete coverage of the desired interval with the consolidating fluid, while raising the gas generator into a position which generally is immediately adjacent the interval to be treated (as illustrated in FIG. 2). When the wellbore contains a completion fluid and has been previously perforated, the initial fluid pumped from the tubing may be a spacer fluid to separate the consolidating fluid from the completion fluid. The volume of spacer fluid utilized may vary over a wide range as desired by an individual skilled in the art. If no fluid is present in the wellbore adjacent the perforations, sufficient spacer fluid may be introduced to fill the wellbore to the level of the lowest perforations to facilitate placement of the consolidation fluid adjacent the perforated interval. The quantity of consolidating fluid introduced into the wellbore is that which is sufficient to fill the wellbore over the desired interval to be treated. Typically, this may be from about 3 to 100 gallons per foot of interval to be treated. The consolidating fluid preferably is completely displaced from the coiled tubing and into the wellbore before activation of the gas generator.

The gas generating charge may be contained within any suitable housing. It is preferred that the housing be generally cylindrical in nature and have a diameter considerably less than the inside diameter of the casing in the wellbore to permit the presence of consolidating fluid alongside the housing within the wellbore. The fluid surrounding the housing will have more or less the form of an annulus, depending upon whether the housing is centered in the wellbore, or is located to one side of the center. The housing may be supported within the wellbore by a cable or by connections to a tubing string extending to the surface.

The gas generating charge in the housing comprises predominately a propellant which is relatively slow burning and nondetonating. Propellants of this type are well known in the art so that it is unnecessary to discuss the numerous specific types available. The propellant may comprise, for example, a modified nitrocellulose or modified or unmodified nitroamine or a composite such as a composite containing ammonium perchlorate and a rubberized binder. Suitable propellants are disclosed in, for example, U.S. Pat. Nos. 4,590,997 and 4,739,832, the disclosures of which are incorporated by reference.

The charge may be ignited by any conventionally actuated detonator or any other suitable device. As combustion of the charge in the housing progresses after ignition, the gas pressure generated in the housing is released by means such as pressure discs which unseat at a predetermined pressure from ports in the housing or any other suitable pressure release means into the consolidating fluid within the wellbore. As the gas enters the wellbore, the pressure continues to increase rapidly and ultimately forces at least a portion of the fluid within the casing in the wellbore through the perforation and into the unconsolidated formation. The expanding gas disperses and coats the consolidating fluid from the wellbore upon the incompetent particulate in the subterranean formation. The combustion gas also substantially simultaneously catalyzes at least a portion of the acid curable resin in the consolidating fluid upon contact therewith as a result of the acidic by-products, such as gaseous hydrogen chloride, that are produced during the combustion of the charge. The acidic by-product may result from the combustion process itself as when perchlorates are utilized or may be produced by the reaction of additional constituents admixed with such charge and which activate during the combustion process, such as would result from heat degradation of an acid ester to yield acidic by-products. The gas contacts the consolidating fluid with such force and in such an intimate manner that the resin is caused to rapidly harden as it contacts the particulate in the subterranean formation thereby consolidating the formation around the wellbore. The escaping gas, while catalyzing the resin, also functions to substantially maintain the formation permeability by passing through the pore spaces in the incompetent formation and maintaining the pore spaces in an open condition during catalyzation and hardening of the acid curable resin.

The consolidating fluid can comprise substantially any of the acid curable resins and may include hydrocarbon or aqueous carrier fluids. Examples of such acid curable resins are furan resins, phenol-formaldehyde resins and urea-formaldehyde resins. Of these, furan resins are particularly suitable. The term "furan resins" is used herein to mean condensation resin products derived from furfural or furfuryl alcohol such as furfural-phenol resins, furfuryl alcohol resins, furfural-acetone resins, furfuryl alcohol formaldehyde resins and the like. The most preferred acid curable furan resin for use in accordance with the present invention is a furfuryl alcohol resin.

The aqueous carrier may comprise aqueous salt solutions such as solutions of sodium, potassium or ammonium chloride, solutions of tetramethyl ammonium chloride, heavy brines containing calcium chloride or bromide, naturally occurring oil-field brines and sea water.

In preferred embodiments of the present invention, the consolidating fluid utilized is comprised of one of the acid curable resins described above combined with a diluent additive, such as for example, at least one member selected from the group consisting of furfuryl alcohol, butyl lactate, tetrahydrofurfuryl methacrylate, tetrahydrofurfuryl acrylate, esters of phthalic acid, furfural and dibasic esters of oxalic, maleic and succinic acids. The resin diluent can comprise substantially any of the well known diluent compounds. Such resin diluent additives impart a variety of desirable properties to the acid curable resin including lowering the viscosity of the resin, improving the dispersability of the resin in an aqueous carrier, reducing the solubility of the resin in an aqueous carrier, improving the coating of solids by the resin, improving the compressive strength of solids consolidated with the resin and allowing the resin to be utilized in low salinity carriers such as 2% by weight aqueous solutions of potassium chloride or ammonium chloride.

The consolidating fluid containing an acid curable resin can include a resin diluent additive of the type described above in amounts of up to about 50% by volume of the consolidating fluid. Preferably the diluent is present in an amount in the range of from about 0 to about 30% by volume.

The consolidating fluid also may include a coupling agent to promote strong resin-to-sand bonding such as an organosilicon compound. A preferred such compound is N-beta(aminoethyl)-gamma-amino-propyl-trimethoxy silane.

Preferred resins or consolidating fluids for use in accordance with the present invention are, for example, the product "SANDFIX A" resin available from Halliburton Energy Services, "DUREZ 14407" resin available from Occidental Chemical Company and "FAREZ B-260" resin and "QUACORR 1300" resin available from Quaker Chemical Company.

The consolidating fluid also may include other additives, such as buffers, corrosion inhibitors and the like provided that the additive does not adversely react with the other constituents to prevent consolidation of the formation.

After the combustion of the gas generator charge has caused at least a portion of the consolidating fluid to enter the formation and be catalyzed, the remaining spacer fluid is pumped from the coiled tubing followed by the catalyst. The spacer fluid causes at least a portion of any consolidating fluid remaining in the wellbore to enter the formation. The spacer fluid utilized in the method of the present invention can be substantially any fluid which does not immediately catalyze the consolidating fluid, such as for example, the aqueous carrier fluid described above. The spacer fluid drives the consolidating fluid through the perforations and past the previously catalyzed resin into the unconsolidated formation. The acid curable resin in the consolidating fluid coats the particulates in the formation as it passes from the wellbore. Thereafter, the catalyst is pumped into the wellbore and out into the formation to catalyze the remaining acid curable resin. The catalyst is displaced into the formation from the coiled tubing with a displacement fluid. The displacement fluid may be substantially any fluid that does not adversely effect the catalyst such as the spacer fluid. Such additional displacement and catalyst overflush treatment extends the distance from the wellbore over which the subterranean formation is consolidated.

In another embodiment of the present invention, the consolidation is effected substantially contemporaneously with perforation of the wellbore. In this instance, a perforating gun is attached by a suitable sub to the lower end of the gas generator. Methods of tubing conveyed perforating are well known and any conventional pressure activated or other suitable method may be utilized to effect the perforation of the wellbore. In this instance, after perforations are formed, the coiled tubing can be lowered into the wellbore to position the gas generator and firing head as previously described. Alternatively, the gas generator may be ignited by the same detonation means employed to activate the perforating gun, after an appropriate delay to permit repositioning of the coiled tubing. The fluids are introduced from the coiled tubing into the wellbore in the manner previously described. The perforating gun may be severed from the coiled tubing after detonation or remain attached for subsequent retrieval upon removal of the coiled tubing.

Although the invention has been described in terms of particular embodiments which are believed to represent the best modes of the invention at this time, it will be recognized by those skilled in the art that various changes may be made in the compositions or method of this specification without departing from the scope of the invention as defined in the following claims. The terms and expressions which have been utilized are used as terms of description and not of limitation, and there is no intention in the use of such terms and expressions of excluding any equivalents of the features shown and described herein.

What is claimed is:

1. A method of consolidating incompetent particulate in a subterranean formation surrounding a perforated wellbore penetrating the subterranean formation comprising:

introducing at least a catalyst, spacer fluid and consolidating fluid including an acid curable resin into a coiled tubing string while said tubing is still outside the wellbore;

attaching a pressure actuated variable time delay firing head and a gas generating charge to an end of said coiled tubing;

introducing the end of said coiled tubing having said firing head and gas generating charge attached into said wellbore and positioning said firing head in the vicinity of the lowest perforations in the wellbore which are to be treated with a consolidating fluid;

activating said firing head by application of a predetermined pressure whereby the time delayed ignition of said gas generating charge is effected and ports in said firing head open whereby fluid in said coiled tubing string may be pumped into said wellbore;

introducing said consolidating fluid into said wellbore from said tubing and positioning said gas generator charge in said wellbore in the vicinity of said perforations to be treated;

igniting said gas generating charge whereby high pressure combustion product gases are produced and at least a portion of said consolidating fluid is caused to flow through at least one of the perforations and into the subterranean formation adjacent said perforations by said gas pressure;

coating at least a portion of said incompetent particulate in said formations with said consolidating fluid;

catalyzing at least a portion of said acid curable resin in said consolidating fluid by contact with gaseous acidic products produced during combustion of said gas generating charge whereby at least a portion of the coated particulate is consolidated;

displacing at least a portion of any consolidating fluid remaining in said wellbore through at least one of the perforations and into the formation beyond the previously consolidated particulate in said formation to coat additional incompetent particulate; and introducing a catalyst from said tubing into said wellbore and into said formation to catalyze at least a portion of said acid curable resin in said displaced consolidating fluid whereby said resin is caused to consolidate at least a portion of said additional incompetent particulate.

2. The method of claim 1 wherein the acid curable resin comprises at least one member selected from the group of furan resins, phenol-formaldehyde resins and urea-formaldehyde resins.

3. The method of claim 1 wherein said consolidating fluid includes a resin diluent.

4. The method of claim 3 wherein said diluent comprises at least one member selected from the group of tetrahydrofurfuryl methacrylate, tetrahydrofurfuryl acrylate, esters of phthalic acid, furfuryl alcohol, butyl lactate furfural and dibasic esters of oxalic, maleic and succinic acids.

5. The method of claim 1 wherein said consolidating fluid includes a coupling agent to promote resin to formation bonding upon catalyzation of the resin.

6. The method of claim 5 wherein said coupling agent comprises an organosilicon compound.

7. The method of claim 1 wherein said consolidating fluid includes an aqueous carrier fluid.

8. A method of consolidating incompetent particulate in a subterranean formation surrounding a wellbore penetrating the subterranean formation comprising:

introducing at least a catalyst, spacer fluid and consolidating fluid including an acid curable resin into a coiled tubing string while said string is outside said wellbore;

attaching a pressure actuated variable time delay firing head, a gas generating charge and a perforating gun to an end of said string;

introducing the end of said string having said perforating gun attached into said wellbore and positioning said perforating gun within said wellbore in the proximity of a predetermined zone to be perforated having said incompetent particulate;

perforating said predetermined zone of said wellbore;

activating said firing head by application of a predetermined pressure through said string whereby the time delayed ignition of said gas generating charge is effected and ports in said firing head open whereby fluid in said string may be pumped into said wellbore;

introducing said consolidating fluid into said wellbore from said string and positioning said gas generator charge in said wellbore in the vicinity of said perforations after formation thereof in said wellbore;

igniting said gas generating charge whereby high pressure combustion product gases are produced and at least a portion of said consolidating fluid is caused to flow through at least a portion of said perforations and into the subterranean formation adjacent said perforations by said gas pressure;

coating at least a portion of said incompetent particulate in said formation with said consolidating fluid;

catalyzing at least a portion of said acid curable resin in said consolidating fluid by contact with gaseous acidic products produced during combustion of said gas generating charge whereby at least a portion of the coated particulate is consolidated;

displacing at least a portion of any consolidating fluid remaining in said wellbore through at least one perforation and into the formation beyond the previously consolidated particulate in said formation to coat additional incompetent particulate; and introducing a catalyst from said tubing into said wellbore and into said formation to catalyze at least a portion of said acid curable resin in said displaced consolidating fluid whereby said resin is caused to consolidate at least a portion of said additional incompetent particulate.

9. The method of claim 8 wherein the acid curable resin comprises at least one member selected from the group of furan resins, phenol-formaldehyde resins and urea-formaldehyde resins.

10. The method of claim 8 wherein said consolidating fluid includes a resin diluent.

11. The method of claim 8 wherein said diluent comprises at least one member selected from the group of tetrahydrofurfuryl methacrylate, tetrahydrofurfuryl acrylate, esters of phthalic acid, furfuryl alcohol, butyl lactate furfural and dibasic esters of oxalic, maleic and succinic acids.

12. The method of claim 8 wherein said consolidating fluid includes a coupling agent to promote resin to formation bonding upon catalyzation of the resin.

13. The method of claim 8 wherein said coupling agent comprises an organosilicon compound.

14. The method of claim 8 wherein said consolidating fluid includes an aqueous carrier fluid.

* * * * *